United States Patent
Lin et al.

(10) Patent No.: US 11,335,100 B2
(45) Date of Patent: May 17, 2022

(54) TRAFFIC LIGHT RECOGNITION SYSTEM AND METHOD THEREOF

(71) Applicant: INDUSTRIAL TECHNOLOGY RESEARCH INSTITUTE, Hsinchu (TW)

(72) Inventors: Yan-Yu Lin, New Taipei (TW); Sheng-Wei Chan, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 230 days.

(21) Appl. No.: 16/728,392

(22) Filed: Dec. 27, 2019

(65) Prior Publication Data

US 2021/0201057 A1 Jul. 1, 2021

(51) Int. Cl.
*G06V 20/58* (2022.01)
*G06K 9/62* (2022.01)

(52) U.S. Cl.
CPC ......... *G06V 20/584* (2022.01); *G06K 9/6261* (2013.01); *G06K 9/6267* (2013.01)

(58) Field of Classification Search
None
See application file for complete search history.

(56) References Cited

U.S. PATENT DOCUMENTS

| | | | |
|---|---|---|---|
| 7,466,841 B2 | 12/2008 | Bahlmann et al. | |
| 9,990,548 B2 * | 6/2018 | Wellington | G05D 1/0088 |
| 10,082,798 B2 * | 9/2018 | Shashua | G01C 21/36 |
| 10,139,832 B2 * | 11/2018 | Sarkar | B60W 30/00 |
| 10,235,885 B2 * | 3/2019 | An | G08G 1/09626 |
| 10,262,532 B2 * | 4/2019 | Hyun | G06K 9/00825 |
| 10,458,810 B2 * | 10/2019 | Fasola | B60W 30/18154 |
| 10,467,487 B1 * | 11/2019 | Wang | B60R 1/005 |

(Continued)

FOREIGN PATENT DOCUMENTS

| | | |
|---|---|---|
| CN | 109101924 A | 12/2018 |
| CN | 109460715 A | 3/2019 |

OTHER PUBLICATIONS

Bach et al., "Deep Convolutional Traffic Light Recognition for Automated Driving," 21st International Conference on Intelligent Transportation Systems (ITSC), Nov. 4-7, 2018, pp. 851-858.

(Continued)

*Primary Examiner* — Anand P Bhatnagar
(74) *Attorney, Agent, or Firm* — Birch, Stewart, Kolasch & Birch, LLP

(57) ABSTRACT

A traffic light recognition system including a map, a localization module, at least one image capturing device and an image processing module is provided. The map is configured to provide an information relevant to a traffic light. The localization module is configured to provide a positioning information relevant to the traffic light. At least one image capturing device is configured to capture a real-time road image relevant to the traffic light. The image processing module is configured to combine the map and the positioning information of the traffic light provided by the localization module to generate a region of interest in the real-time road image captured by the image capturing device, and to recognize the traffic light in the region of interest, wherein the traffic light includes a light box and at least one light signal.

23 Claims, 4 Drawing Sheets

(56) References Cited

U.S. PATENT DOCUMENTS

| | | | |
|---|---|---|---|
| 11,056,005 B2* | 7/2021 | Krivokon | G06K 9/00798 |
| 2009/0303077 A1* | 12/2009 | Onome | G08G 1/096716 |
| | | | 340/901 |
| 2018/0211120 A1 | 7/2018 | Smith et al. | |
| 2019/0332120 A1* | 10/2019 | Choi | G05D 1/024 |
| 2019/0355245 A1* | 11/2019 | Gigengack | G08G 1/0129 |
| 2020/0209009 A1* | 7/2020 | Zhang | G06F 3/04815 |
| 2020/0211375 A1* | 7/2020 | Vig | G01S 13/89 |
| 2020/0410263 A1* | 12/2020 | Gao | G01S 17/931 |
| 2021/0201070 A1* | 7/2021 | Omari | G06K 9/6212 |

OTHER PUBLICATIONS

Bos, "Including traffic light recognition in general object detection with YOLOv2," TUDelft, Jun. 19, 2019, 5 pages.

Cai et al., "Real-time Arrow Traffic Light Recognition System for Intelligent Vehicle," 2012, 7 pages.

Cai et al., "Real-time Recognition System of Traffic Light in Urban Environment," IEEE, 2012, 6 pages.

Gorobetz et al., "Algorithm of Signal Recognition for Railway Embedded Control Devices," IEEE 59th International Scientific Conference on Power and Electrical Engineering of Riga Technical University (RTUCON), 2018, 5 pages.

Lee et al., "Traffic Light Recognition Using Deep Neural Networks," IEEE International Conference on Consumer Electronics (ICCE), 2017, 2 pages.

Omachi et al., "Detection of Traffice Light Using Structural Information," ICSP2010 Proceedings, 2010, pp. 809-812.

Zeng et al., "Traffic Light Recognition and Ranging System Based on Machine Vision," International Conference on High Performance Big Data and Intelligent Systems (HPBD&IS), 2019, pp. 204-208.

Taiwanese Office Action and Search Report for Taiwanese Application No. 108148097, dated Dec. 16, 2020.

\* cited by examiner

TRAFFIC LIGHT RECOGNITION SYSTEM AND METHOD THEREOF

TECHNICAL FIELD

The disclosure relates in general to a recognition system, and more particularly to a traffic light recognition system and a method thereof.

BACKGROUND

Along with the development of the society, motor vehicles have become an essential transportation in people's everyday life. Meanwhile, as the self driving technology and the assisted driving technology are getting more and more matured, each motor vehicle manufacturer is actively engaged with the development of self driving vehicles capable of sensing the environment and navigating the route without people's operations. However, the safety problem, particularly poor recognition of traffic light has come to the fore and become increasingly prominent. Therefore, during the self or assisted driving process, the car control system needs to be equipped with a traffic light recognition system to comply with the instructions of the traffic light and to provide real-time light signal information to the driving control system to assure that decisions are made in compliance with regulations and safety. Therefore, it is very important to increase the accuracy in the automatic recognition of traffic light.

SUMMARY

The disclosure is directed to a traffic light recognition system and a method thereof capable of combining the positioning information and the map to generate a region of interest and recognizing the traffic light in the region of interest to effectively recognize the status of the traffic light.

According to one embodiment, a traffic light recognition system including a map, a localization module, at least one image capturing device and an image processing module is provided. The map is configured to provide an information relevant to a traffic light. The localization module is configured to provide a positioning information relevant to the traffic light. At least one image capturing device is configured to capture a real-time road image relevant to the traffic light. The image processing module is configured to combine the map and the positioning information of the traffic light provided by the localization module to generate a region of interest in the real-time road image captured by the image capturing device, and to recognize the traffic light in the region of interest, wherein the traffic light includes a light box and at least one light signal.

According to another embodiment, a traffic light recognition method is provided. The method includes the following steps. A map with an information relevant to a traffic light is obtained. A positioning information relevant to the traffic light is obtained. A real-time road image relevant to the traffic light is obtained. The map and the positioning information are combined to generate a region of interest in the real-time road image, and the traffic light in the region of interest is recognized, wherein the traffic light includes a light box and at least one light signal.

The above and other aspects of the disclosure will become better understood with regard to the following detailed description of the preferred but non-limiting embodiment(s). The following description is made with reference to the accompanying drawings.

Figure 1:
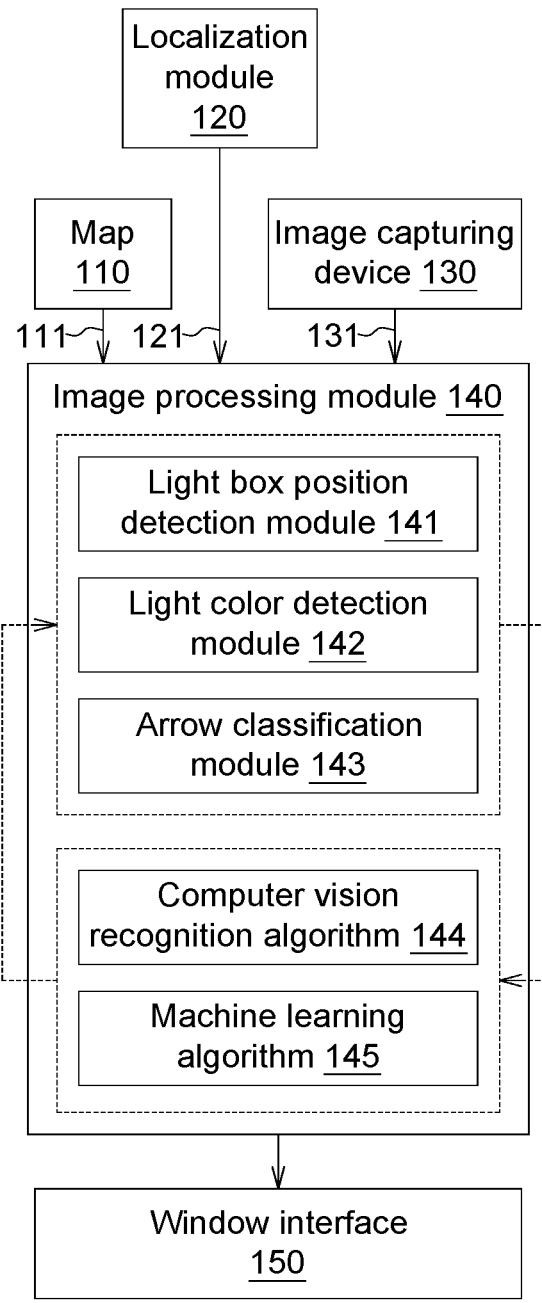
FIG. 1 is a schematic diagram of a traffic light recognition system according to an embodiment of the disclosure.

In the following detailed description, for purposes of explanation, numerous specific details are set forth in order to provide a thorough understanding of the disclosed embodiments. It will be apparent, however, that one or multiple embodiments may be practiced without these specific details. In other instances, well-known structures and devices are schematically shown in order to simplify the drawing.

DETAILED DESCRIPTION

Detailed descriptions of the disclosure are disclosed below with a number of embodiments. However, the disclosed embodiments are for explanatory and exemplary purposes only, not for limiting the scope of protection of the disclosure. Similar/identical designations are used to indicate similar/identical elements. Directional terms such as above, under, left, right, front or back are used in the following embodiments to indicate the directions of the accompanying drawings, not for limiting the present disclosure.

According to an embodiment of the disclosure, a traffic light recognition system is provided. The traffic light recognition system is configured to obtain a map, a positioning information and a real-time road image relevant to a traffic light, combine the map and the positioning information to generate a region of interest in the real-time road image, and recognize the traffic light in the region of interest to increase the recognition accuracy and recognition distance of the system. The traffic light recognition system of the present embodiment can be used in a driving control system of a vehicle to recognize the traffic light during the self driving process or the assisted driving process.

Referring to FIG. 1, a schematic diagram of a traffic light recognition system 100 according to an embodiment of the disclosure is shown. The traffic light recognition system 100 includes a map 110, a localization module 120, at least one image capturing device 130 and an image processing module 140. The map 110 is configured to provide an information relevant to a traffic light 111, such as a map coordinate or a GPS coordinate of the traffic light 111 (the traffic light 111 can be disposed at such as the intersection of urban streets, before level crossing, above toll lane, next to pedestrian crossing, or at traffic separation island). The localization module 120 is configured to provide a positioning information 121 relevant to the traffic light 111. The localization module 120, which includes a lidar module or a global positioning system (GPS) tracker, is disposed on a vehicle to detect relative position or coordinates between the vehicle and the traffic light 111.

In an embodiment, the lidar module emits a laser light, and captures a three-dimensional (3D) point cloud data using the time-of-flight technology; the localization module 120 obtains the map coordinate marking the position of the traffic light 111 from the map 110 according to the 3D point cloud data, and further calculates relative position between the vehicle and the traffic light 111 according to the map coordinate of the vehicle and the map coordinate of the traffic light 111. Thus, during the driving process of the vehicle, the localization module 120 can obtain the positioning information 121 relevant to the traffic light 111 in a real-time. In another embodiment, the GPS tracker obtains the GPS coordinate of the vehicle according to the ephemeris parameters and the time parameters continuously received from the satellites; the localization module 120 obtains the GPS coordinate marking the position of the traffic light 111 from the map 110, and detects relative position between the vehicle and the traffic light 111 according to the GPS coordinate of the vehicle and the GPS coordinate of the traffic light 111. Thus, during the driving process of the vehicle, the localization module 120 can obtain the positioning information 121 relevant to the traffic light 111 in a real-time.

Figure 2:
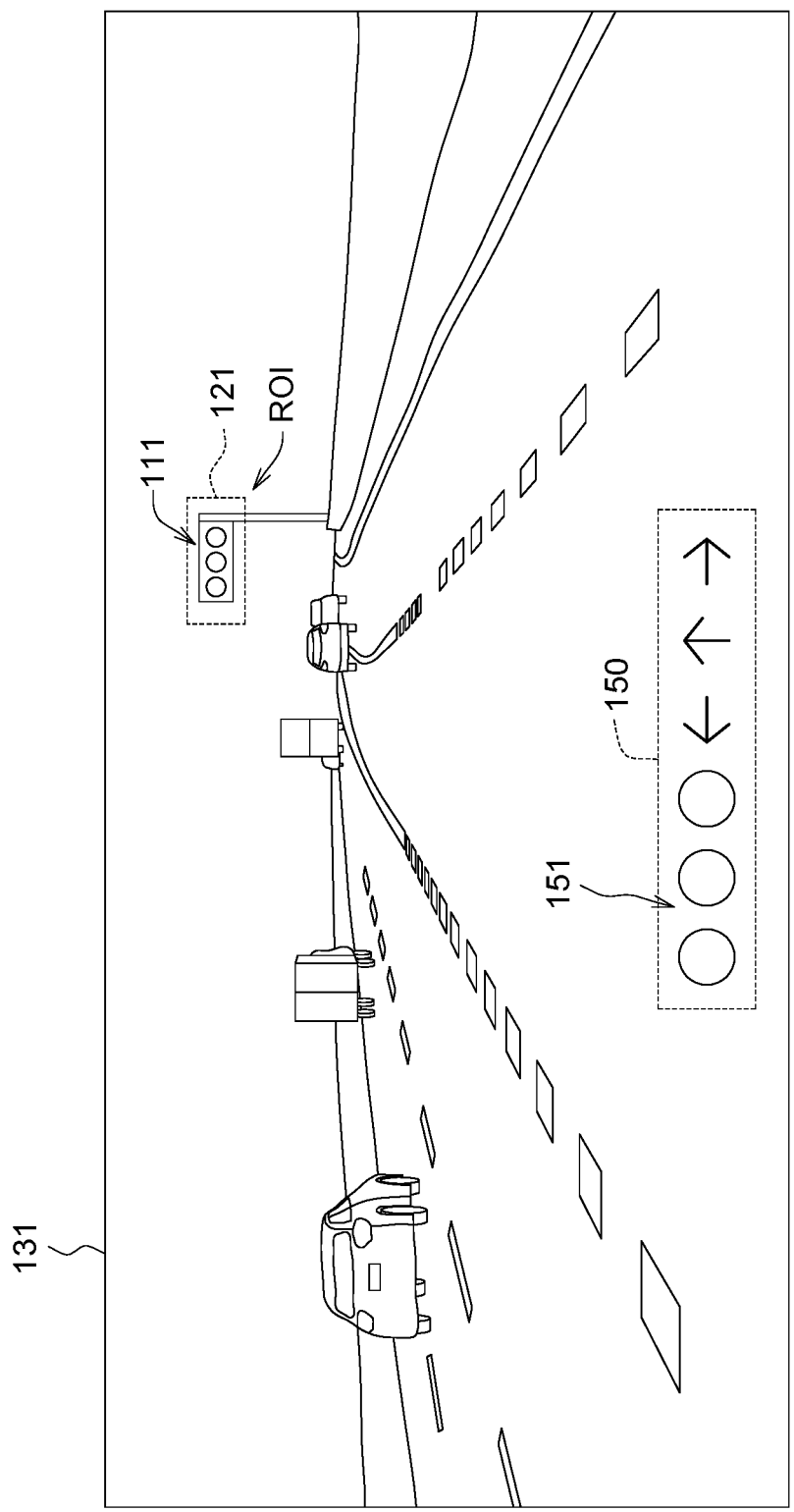
FIG. 2 is a schematic diagram of a real-time road image according to an embodiment of the disclosure, wherein the region of interest corresponds to a predetermined position of the traffic light in a real-time road image.

Refer to FIG. 2. The image capturing device 130 is configured to capture a real-time road image 131 relevant to the traffic light 111. The image capturing device 130 can be a camera disposed at the front end or two sides of the vehicle to capture the real-time road image 131 ahead of the vehicle. As indicated in FIG. 1, the map 110, the positioning information 121 and the real-time road image 131 can be transmitted to the image processing module 140, and the recognition accuracy can be increased by using a computer vision recognition algorithm 144 or a machine learning algorithm 145. Thus, during the driving process of the vehicle, the traffic light recognition system 100 can accurately recognize the position of the traffic light 111 and the displayed light signals 113-115 from the real-time road image 131.

In an embodiment, the traffic light recognition system 100 combines the positioning information 121 and the in-built map 110, obtains the map coordinate, analyzes the map coordinate to determine whether the real-time road image 131 ahead of the vehicle contains a traffic light 111 (such as the red green light, the pedestrian crossing light, or the level crossing traffic light), and confirms the sorting and type of the light signals 113-115 of the traffic light 111 according to the map 110, such that the traffic light recognition system 100 can recognize the status of the traffic light 111 in a real-time. The status of the traffic light 111 is, for example but not limited to, the light color (red, yellow, or green) or the arrow direction (upward, leftward, or rightward) displayed on the traffic light, the number displayed on the countdown signal, the double flashing red light signal exclusive for level crossing, the double flashing yellow light signal exclusive for pedestrian crossing, or the ramp instrumentation light signal.

Refer to FIG. 2. The image processing module 140 generates a region of interest ROI in the real-time road image 131 and recognizes the traffic light 111 in the region of interest ROI. The region of interest ROI corresponds to the predetermined position of the traffic light 111 in the real-time road image 131. For example, the image processing module 140 locates the position of the traffic light 111 in the real-time road image 131 according to machine learning based on selective search, convolutional neural network (CNN) model, support vector machine (SVM) classifier or Yolov3 algorithm. The selective search considers spatial distribution, distance similarity, size similarity and filling similarity of the point clouds, and separates partial features similar to the traffic light 111 from the point cloud data to generate a region of interest ROI. Meanwhile, the image processing module 140 only needs to perform numeric analysis to the region of interest ROI where the position of the traffic light 111 is located instead of the full image, such that the computation time is relatively reduced.

Figure 3:
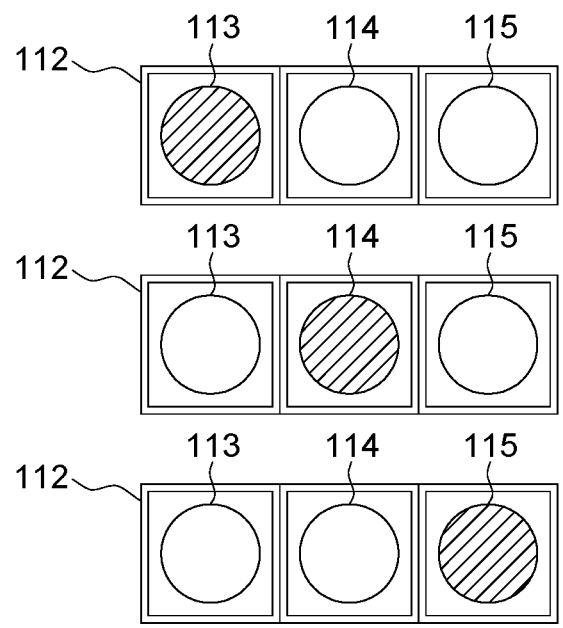
FIG. 3 is a schematic diagram of the sorting and type of a light signal according to an embodiment of the disclosure.
Figure 4:
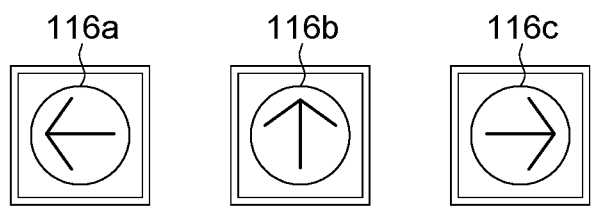
FIG. 4 is a schematic diagram of the sorting and type of a light signal according to an embodiment of the disclosure.

Refer to FIG. 1. In an embodiment, the image processing module 140 includes a computer vision recognition algorithm 144 and/or a machine learning algorithm 145 configured to recognize the traffic light 111 in the region of interest ROI. Besides, the image processing module 140 may include a light box position detection module 141 configured to detect a light box position of the traffic light 111 in the region of interest ROI as indicated in FIG. 2. Additionally, the image processing module 140 may include a light color detection module 142 configured to detect a light color displayed at the light box position as indicated in FIG. 3. Moreover, the image processing module 140 may include an arrow classification module 143 configured to determine an arrow direction displayed at the light box position as indicated in FIG. 4.

Generally speaking, the traffic light 111 includes a light box 112 and light signals 113-115. As indicated in FIG. 3, the light box 112 can be rectangular or squared. The light signals 113-115 can be formed of lamp surfaces and light emitting elements of different colors, and each of the light signals 113-115 can have a circle shape or an arrow shape, and have a size of about 20 cm to 30 cm. When the light signals 113-115 are not blocked or the weather allows, the illumination of the light signals 113-115 allows the colors of the light signals to be clearly seen by the drivers at a distance of 400 m. The light box 112 may include one or multiple light signals 113-115. The light signals 113-115 may display one color, two colors (red and green) or three colors (red, yellow and green) as indicated in FIG. 4. The light signal may display one or multiple arrow patterns 116a-116c, which can be arranged in parallel with the light signals 113-115 of red, yellow, and green colors.

The light signals 113-115 and the arrow patterns 116a-116c can be arranged horizontally or vertically to comply with the local rules and regulations regarding the arrangement of the traffic lights. For example, the light signals can be horizontally arranged left to right in the order of red light signal (113), yellow light signal (114), green light signal (115), left-turn green arrow signal (116a), straight green arrow signal (116b), and right-turn green arrow signal (116c). The light signals can also be vertically arranged top down in the order of red light signal (113), yellow light signal (114), green light signal (115), straight green arrow signal (116b), left-turn green arrow signal (116a), and right-turn green arrow signal (116c). Additionally, a squared countdown signal displaying the number in red color can be disposed beside the red light signal (113) or in the yellow light signal to show the remaining time (seconds) of the red light.

In FIG. 1, the light box position detection module 141, the light color detection module 142 and the arrow classification module 143 can be trained by a machine learning algorithm 145 and/or a computer vision recognition algorithm 144. However, when no recognition result is obtained by using machine learning algorithm 145, the recognition result obtained by using the computer vision recognition algorithm 144 can be outputted, and vice versa.

In an embodiment, when both the computer vision recognition algorithm 144 and the machine learning algorithm 145 are used, the image processing module 140 compares the recognition results obtained by the two algorithms, and determines the recognition result of the light signal for outputting according to the comparison. If the two algorithms produce the same recognition result, then the recognition result of the light signal is outputted. For example, when the recognition results obtained by the two algorithms are not the same, then the reliable scores of the two recognition results are added up and averaged to obtain an average score. When the average score is larger than a threshold, then the recognition result of the light signal is outputted. Or, the more stable one of the two recognition results is selected, and then the recognition result of the light signal is outputted. That is, the more stable recognition result is that light signal changes in a continuous and stable manner, and will not suddenly change to the yellow light, the red light or the green light. Meanwhile, the image processing module 140 selects the more stable one of the recognition results obtained by the computer vision recognition algorithm 144 and the machine learning algorithm 145 and determines the recognition result of the light signal for outputting according to the selection of recognition result.

The machine learning algorithm 145 can be used in different methods. For example, the machine learning algorithm 145 can be used in the SVM classifier, the ensemble learning classifier or the CNN for depth learning to create a classification model of the traffic light 111. The classification model includes a light color detection module 142 and an arrow classification module 143. The CNN is formed of one or multiple convolutional layers and a fully connected layer at the top end, and also includes association weights and a pooling layer, such that the CNN can operate with the inputted data having 2D structure. In comparison with other depth learning structures, the CNN has better performance in terms of image and object recognition, considers fewer parameters, and has a higher accuracy in object recognition, such as larger than 95%. The CNN has many implementation architectures, such as the regional CNN (R-CNN), the fast R-CNN and the faster R-CNN. The inputted data is divided into multiple regions. Each region is allocated to a corresponding classification, and all regions are combined to complete the detection of the target object (the traffic light).

In the present embodiment, the image processing module 140 can superimpose the real-time road image 131 (RGB image), the lidar positioning information (the coordinates of the point cloud data) or the GPS positioning information (the coordinates of latitude and longitude) and the coordinates of the map 110 to obtain an RGB image of the positioning information 121 relevant to the traffic light 111 as indicated in FIG. 2, create a data set according to multiple RGB images of the positioning information relevant to the traffic light 111, and input the data set to the CNN for machine learning to create a classification model of the traffic light 111. Lastly, a decision corresponding to the recognition result is made according to the classification model of the traffic light 111 and is outputted to complete automatic recognition of traffic light 111.

Alternatively, the image processing module 140 can superimpose the real-time road image 131 (RGB image), the lidar positioning information (the coordinates of the point cloud data) or the GPS positioning information (the coordinates of latitude and longitude) and the coordinates of the map 110 to obtain an RGB image of the positioning information 121 relevant to the traffic light 111 as indicated in FIG. 2, and input the RGB image of the positioning information 121 relevant to the traffic light 111 to the computer to perform computer vision image processing to complete automatic recognition of traffic light 111. The computer vision image processing method includes the following steps. RGB-HSV color space conversion is performed; color brightness of a current image is displayed in the HSV the color space; color intervals corresponding to the light colors (red, yellow, and green) are located in the HSV color space; the located color intervals are divided and are processed with binarization processing to generate a foreground and a background; each connected part in the foreground is marked as a connected region, which is the region of interest ROI relevant to the traffic light 111; the light signal information of the current image is confirmed according to the morphology, area and shape of the connected region and is provided to the next image. The light signal information includes the position of the light box 112, the color information of the light signals 113-115 and the information of the arrow patterns 116a-116c as indicated in FIG. 2 to FIG. 4. Besides, when the image is processed with binarization processing, since the color and the brightness of the traffic light 111, weather conditions and ambient light (such as backlight, rains and fogs) may affect the recognition result of the traffic light 111, noises and backlight of the binarized image are removed to increase the recognition accuracy.

In an embodiment, when the weather is poor or in extreme conditions (such as backlight), an advanced computer vision image processing method can be used to increase the recognition accuracy of the traffic light 111. Firstly, whether the weather is in extreme conditions is determined according to the color brightness in the HSV the color space; if the brightness is lower than a threshold, then the weather is determined as extreme conditions. Then, histogram equalization and gamma correction are performed to each light color of the RBG image to enhance the light color. Morphology image processing is used to remove the noises of the lamp signal; meanwhile, the appearance of the light signals 113-115 can be maintained. Then, the position of each of the light signals 113-115 in the light box is divided, and the overlap region is calculated. The status of the light signals 113-115 is determined according to whether the overlap region is larger than a threshold. If the overlap region is larger than a threshold, then it is determined that the light signal is on.

In an embodiment, the maximum detectable distance of the traffic light is such as 100 m, and the minimum detectable resolution of the light box is such as 6×14 pixels. The following table lists the experimental data of recognition accuracy and recall rate corresponding to increased detectable distance. The experimental result shows that when the detectable distance is less than 100 m, the accuracy being greater than 95% and the recall rate being greater than 92% match the requirement in remote recognition of the traffic light.

| Detectable distance | <30 m | <40 m | <50 m | <100 m |
|---|---|---|---|---|
| Accuracy | 98.4% | 97.4% | 97.6% | 95.82% |
| Recall rate | 99.2% | 96.7% | 96.01% | 92.55% |

In the above embodiment, the positioning information 121 is combined with the map 110 to generate a region of interest ROI. However, the region of interest ROI still can be generated even when the positioning information 121 is not combined with the map 110. Therefore, the disclosure does not require the positioning information 121 to be combined with the map 110. The following table lists the experimental data of recognition accuracy and recall rate obtained when the positioning information 121 is or is not combined with the map 110. The experimental result shows that when the detectable distance of traffic light is less than 100 m, if the map 110 is not used, accuracy drops to 85.91%, and recall rate drops to 73.9%. Therefore, when the positioning information 121 is combined with the map 110, the accuracy and the recall rate in remote recognition can be effectively increased.

|  | Detectable distance | <30 m | <40 m | <50 m | <100 m |
|---|---|---|---|---|---|
| Accuracy | With map | 98.4% | 97.4% | 97.6% | 95.82% |
|  | Without map | 76.83% | 88.58% | 85.9% | 85.91% |
| Recall rate | With map | 99.2% | 96.7% | 96.01% | 92.55% |
|  | Without map | 72.13% | 77.02% | 76.06% | 73.9% |

As disclosed in above embodiments of the disclosure, the positioning information 121 is combined with the map 110 to generate a region of interest ROI, and is further combined with the recognition result obtained from machine learning and the recognition result obtained from computer vision image processing to recognize the traffic light 111 in the region of interest ROI, increase recognition accuracy and achieve remote recognition. Therefore, the traffic light recognition system 100 of the disclosure is capable of resolving the problems of the conventional image recognition system, such as having low resolution and being unable to increase the accuracy in remote recognition. The traffic light recognition system 100 of the disclosure is also capable of resolving the problems encountered in image processing, such as consuming a large amount of computer resources, taking a long operation time, and making erroneous judgments due to weather influence.

Figure 5:
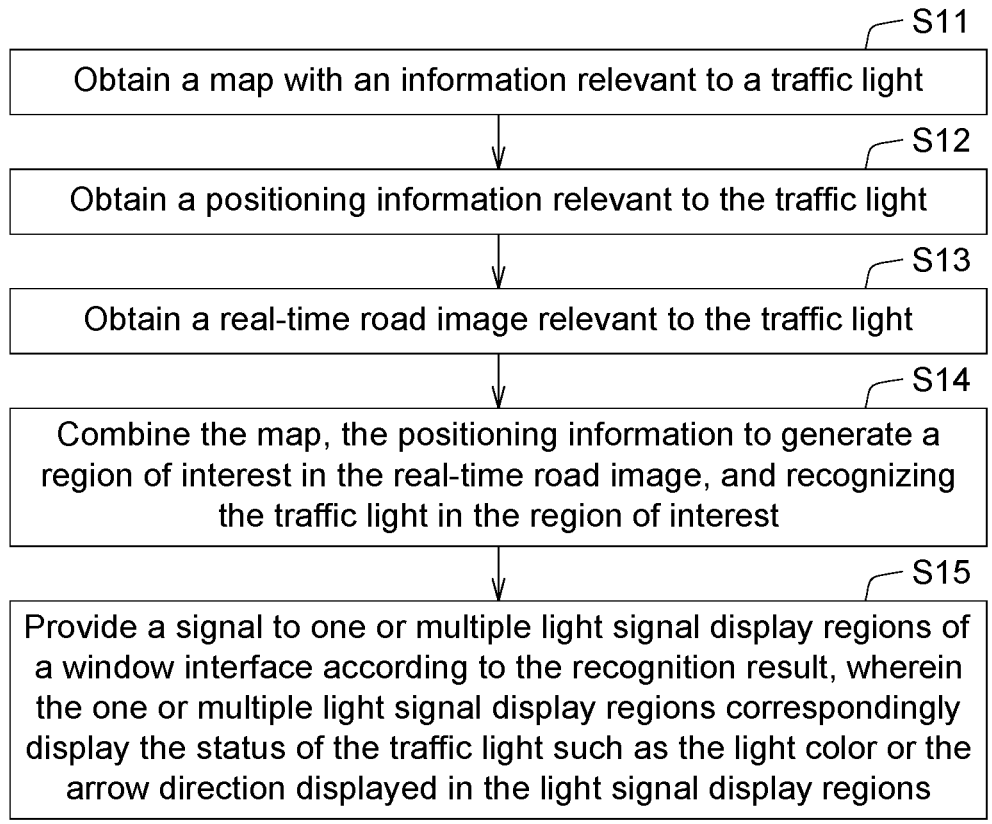
FIG. 5 is a flowchart of a traffic light recognition method according to an embodiment of the disclosure.

Referring to FIG. 5, a flowchart of a traffic light recognition method according to an embodiment of the disclosure is shown. Based on the above disclosure and drawings, the traffic light recognition method may include steps S11-S15. In step S11, a map 110 with information relevant to a traffic light 111 is obtained. In step S12, a positioning information 121 relevant to the traffic light 111 is obtained. In step S13, a real-time road image 131 relevant to the traffic light 111 is obtained. In step S14, the map 110, the positioning information 121, are combined to generate a region of interest ROI in the real-time road image 131, and the traffic light 111 in the region of interest ROI is recognized. In step S15, the method further may include providing a signal to one or multiple light signal display regions 151 of a window interface 150 according to the recognition result, wherein the one or multiple light signal display regions 151 correspondingly display the status of the traffic light 111 such as the light color or the arrow direction displayed in the light signal display regions 151 to inform the drivers of the currently displayed light signal and its color.

In an embodiment, the traffic light recognition method may include generating a map coordinate according to the positioning information 121 and the map 110 provided by a lidar module or a GPS tracker. Then, the map coordinate is analyzed to obtain the region of interest ROI corresponding to the predetermined position of the traffic light in the real-time road image 131, and the sorting and type of the traffic light 111 is confirmed according to the map 110.

Figure 6:
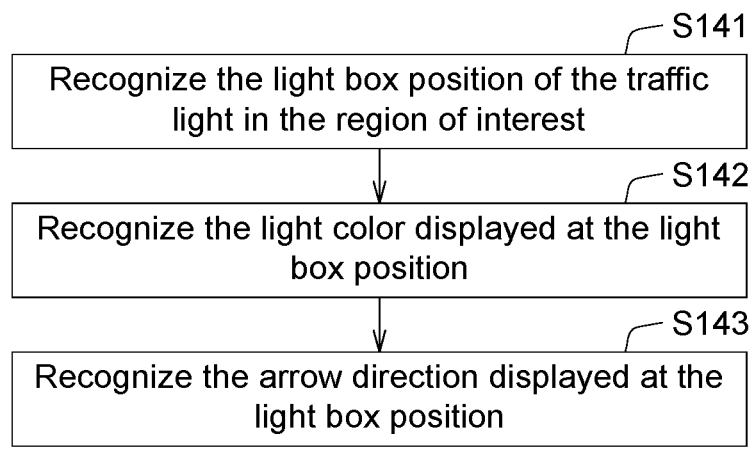
FIG. 6 is a flowchart for recognizing the traffic light in the region of interest according to an embodiment of the disclosure.

Refer to FIG. 6. The recognition of the region of interest ROI in the traffic light 111 includes steps S141-S143. In step S141, the light box position of the traffic light in the region of interest ROI is recognized as indicated in FIG. 2. In step S142, the light color displayed at the light box position is recognized as indicated in FIG. 3. In step S143, the arrow direction displayed at the light box position is recognized as indicated in FIG. 4. In steps S141-S143, the recognition of traffic light is trained by a computer vision recognition algorithm or a machine learning algorithm. Correct light signal of the traffic light 111 is outputted according to the comparison between the recognition result obtained by the computer vision recognition algorithm 144 and that obtained by the machine learning algorithm 145. Or, when no recognition result is obtained by the machine learning algorithm 145, the recognition result obtained by the computer vision recognition algorithm 144 is outputted, and vice versa.

According to the traffic light recognition system and the recognition method thereof disclosed in above embodiments of the disclosure, a map relevant to a traffic light, a positioning information and a real-time road image are obtained; the map and the positioning information are combined to generate a region of interest in the real-time road image; and real-time light signal information is provided to a driving control system or is displayed on a window interface through the traffic light in the region of interest. The disclosure combines the recognition result obtained from machine learning and the recognition result obtained from computer vision image processing, and therefore reduces the operation time and the interference caused by poor weather or extreme weather conditions, increases the accuracy in the automatic recognition of traffic light, achieves remote recognition, and achieves the recognition of traffic light during self or assisted driving.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A traffic light recognition system, comprising:
a map configured to provide an information relevant to a traffic light;
a localization module configured to provide a positioning information relevant to the traffic light according to the information of the traffic light in the map;
at least one image capturing device configured to capture a real-time road image; and
an image processing module configured to combine the information of the traffic light in the map and the positioning information relevant to the traffic light provided by the localization module to generate a region of interest in the real-time road image captured by the image capturing device, and to recognize the traffic light in the region of interest, wherein the traffic light comprises a light box and at least one light signal.

2. The system according to claim 1, wherein the localization module generates a map coordinate according to the positioning information provided by a lidar module or a GPS tracker and the map.

3. The system according to claim 2, wherein the image processing module analyzes the map coordinate to obtain the region of interest corresponding to a predetermined position of the traffic light in the real-time road image from the real-time road image, and confirms sorting and type of the at least one light signal of the traffic light according to the map.

4. The system according to claim 1, wherein the image processing module comprises a light box position detection module configured to detect a position of the light box of the traffic light in the region of interest.

5. The system according to claim 4, wherein the image processing module comprises a light color detection module configured to detect a light color displayed at the position of the light box.

6. The system according to claim 4, wherein the image processing module comprises an arrow classification module configured to determine an arrow direction displayed at the position of the light box.

7. The system according to claim 1, further comprising a window interface comprising at least one light signal display region, correspondingly displaying a status of the traffic light according to a recognition result from the image processing module, wherein the status of the traffic light comprises a light color or an arrow direction displayed by the at least one light signal.

8. The system according to claim 1, wherein the image processing module comprises a light box position detection module, a light color detection module and an arrow classification module; the light box position detection module, the light color detection module and the arrow classification module are trained by a computer vision recognition algorithm or a machine learning algorithm.

9. The system according to claim 1, wherein the image processing module comprises a computer vision recognition algorithm or a machine learning algorithm for recognizing the traffic light.

10. The system according to claim 1, wherein the image processing module comprises a computer vision recognition algorithm and a machine learning algorithm for recognizing the traffic light; the image processing module compares one recognition result obtained by the computer vision recognition algorithm with another recognition result obtained by the machine learning algorithm, and determines a recognition result of the light signal for outputting according to the comparison.

11. A traffic light recognition method, comprising:
obtaining a map with an information relevant to a traffic light;
obtaining a positioning information relevant to the traffic light according to the information of the traffic light in the map;
obtaining a real-time road image relevant to the traffic light; and
combining the information of the traffic light in the map, the positioning information relevant to the traffic light to generate a region of interest in the real-time road image, and recognizing the traffic light in the region of interest, wherein the traffic light comprises a light box and at least one light signal.

12. The method according to claim 11, wherein a map coordinate is generated according to the positioning information provided by a lidar module or a GPS tracker and the map.

13. The method according to claim 12, wherein the map coordinate is analyzed to obtain the region of interest corresponding to a predetermined position of the traffic light in the real-time road image, and sorting and type of the at least one light signal of the traffic light is confirmed according to the map.

14. The method according to claim 11, wherein the recognition of traffic light in the region of interest comprises recognizing a position of the light box of the traffic light in the region of interest.

15. The method according to claim 14, wherein the recognition of traffic light in the region of interest comprises recognizing a light color displayed at the position of the light box.

16. The method according to claim 14, wherein the recognition of traffic light in the region of interest comprises recognizing an arrow direction displayed at the position of the light box.

17. The method according to claim 11, further comprising providing a signal to at least one light signal display region, correspondingly displaying a status of the traffic light, of a window interface, wherein the status of the traffic light comprises a light color or an arrow direction displayed by the at least one light signal.

18. The method according to claim 11, wherein the recognition of traffic light comprises recognizing a light box position in the region of interest, recognizing a light color displayed at the light box position and recognizing an arrow direction displayed at the light box position; the recognition of traffic light is trained by a computer vision recognition algorithm or a machine learning algorithm.

19. The method according to claim 11, wherein the recognition of traffic light comprises a computer vision recognition algorithm or a machine learning algorithm.

20. The method according to claim 11, wherein the recognition of traffic light comprises recognizing the traffic light by a computer vision recognition algorithm and a machine learning algorithm and comparing one recognition result obtained by the computer vision recognition algorithm with another recognition result obtained by the machine learning algorithm, and determines a recognition result of the light signal for outputting according to the comparison.

21. The method according to claim 20, wherein when the recognition result obtained by the computer vision recognition algorithm is the same as the recognition result obtained by the machine learning algorithm, the recognition result of the light signal is outputted.

22. The method according to claim 20, wherein when the recognition result obtained by the computer vision recognition algorithm is not the same as the recognition result obtained by the machine learning algorithm, the recognition result of the light signal is outputted according to more stable one of the two recognition results.

23. The method according to claim 20, wherein when the recognition result obtained by the computer vision recognition algorithm is not the same as the recognition result obtained by the machine learning algorithm, reliable scores of the two recognition results are added and an average score is obtained; when the average score is larger than a threshold, the recognition result of the light signal is outputted.

* * * * *